Figure 1:
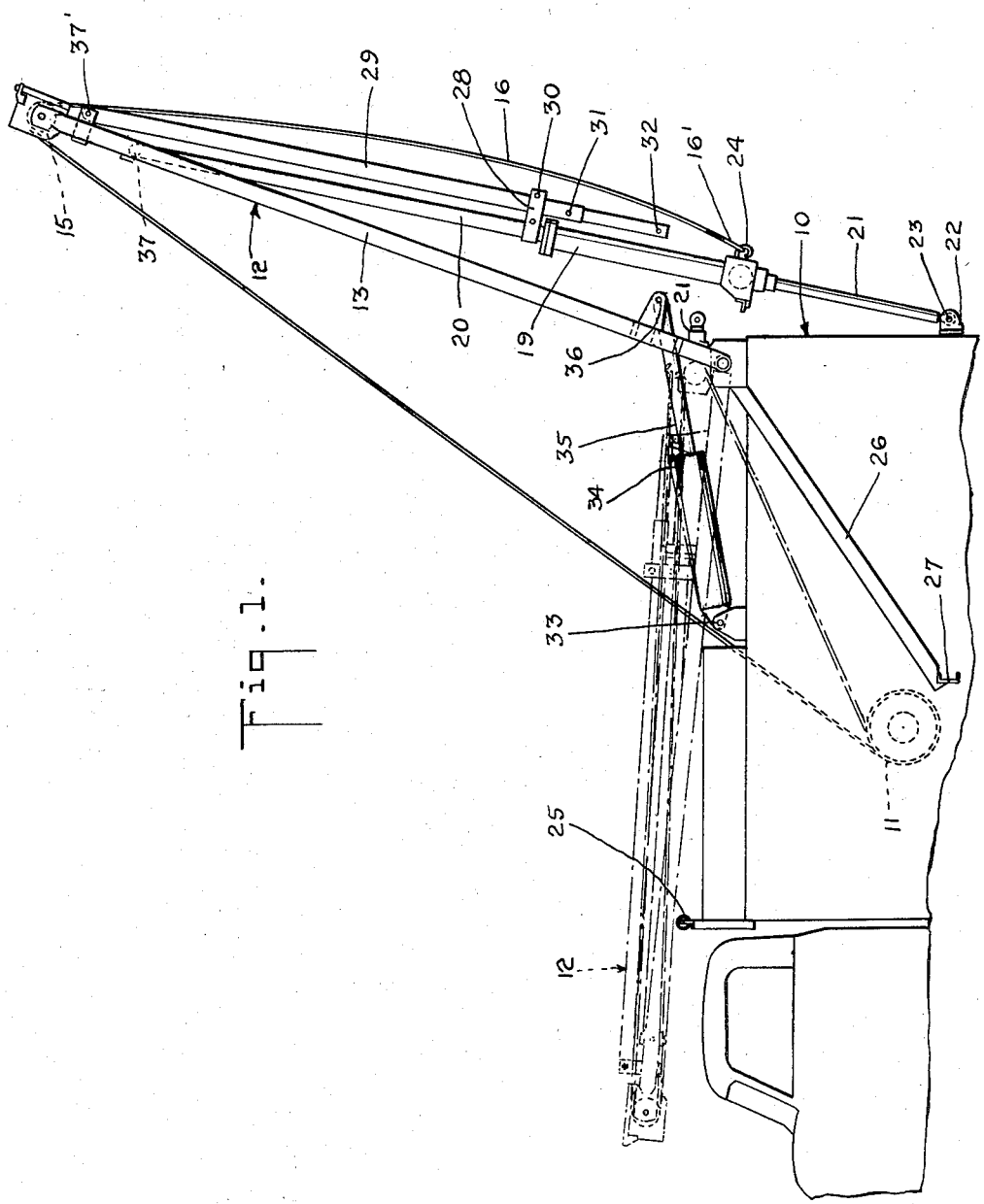

June 10, 1958     H. D. BROWN     2,838,182
HYDRAULICALLY OPERATED TRUCK DERRICKS Filed Aug. 4, 1953     3 Sheets-Sheet 1

INVENTOR
HOWARD D. BROWN
BY
ATTORNEY

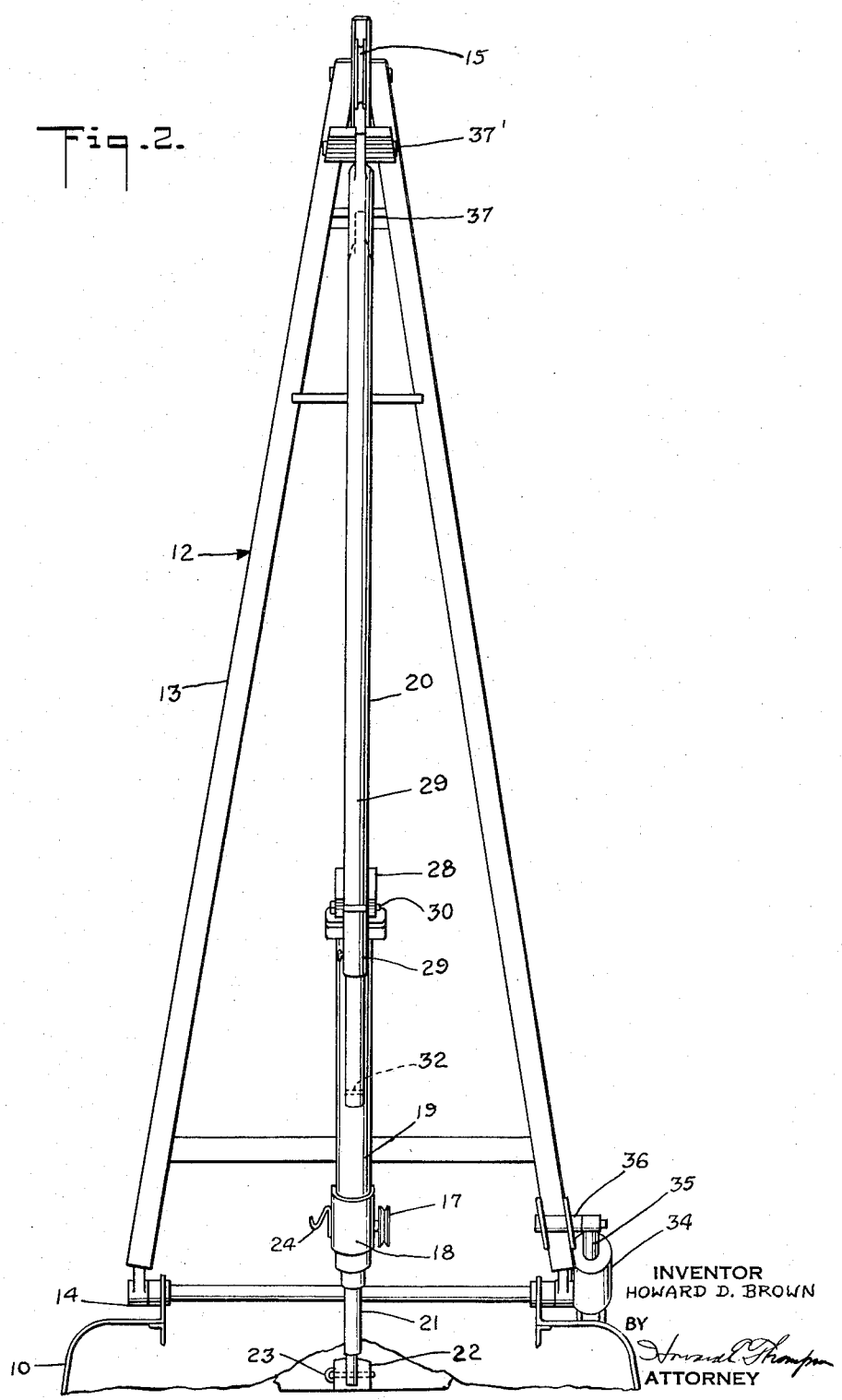

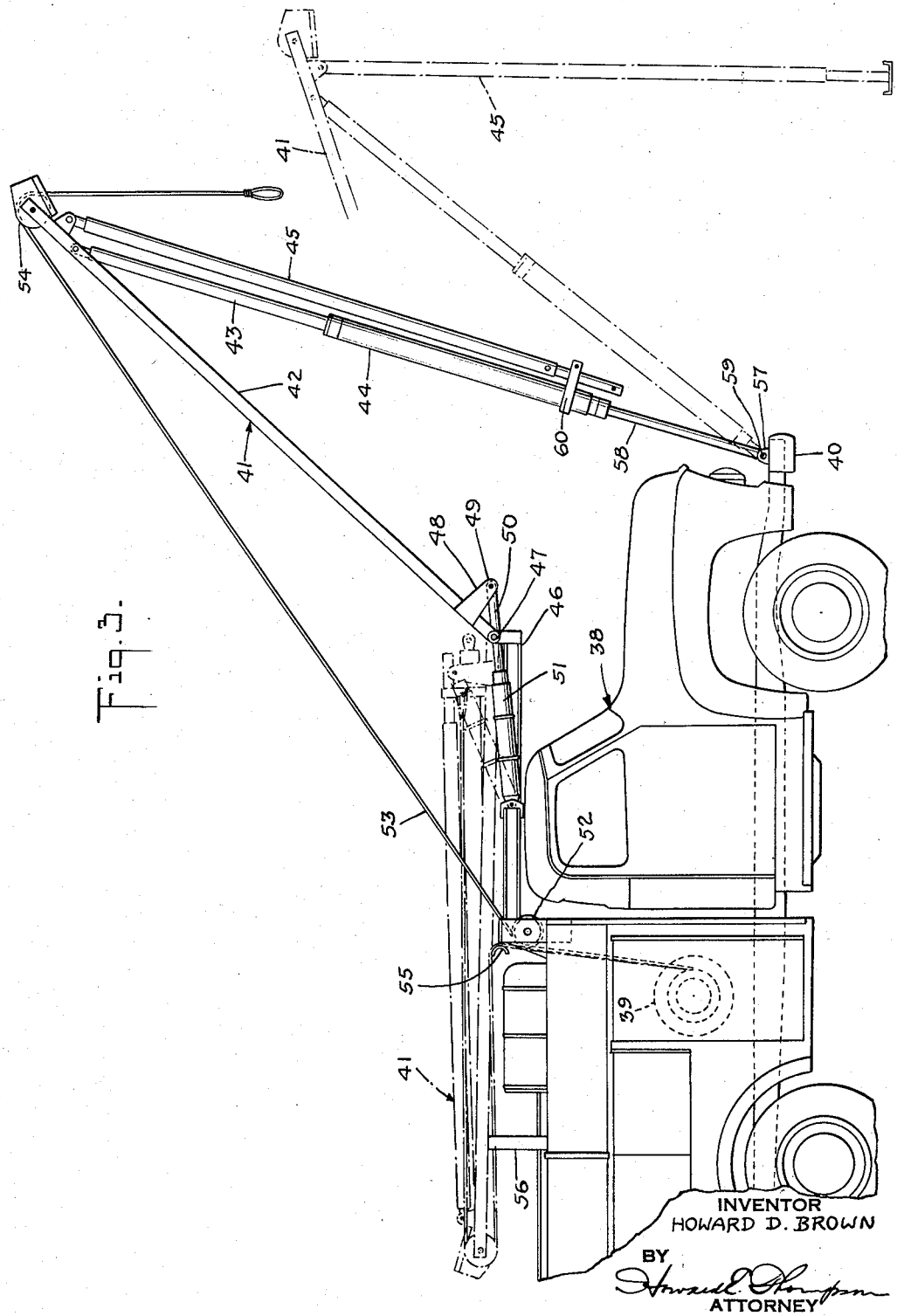

2,838,182
HYDRAULICALLY OPERATED TRUCK DERRICKS

Howard D. Brown, Westfield, N. J.

Application August 4, 1953, Serial No. 372,324

8 Claims. (Cl. 212—8)

This invention relates to derricks used in conjunction with trucks. More particularly, the invention deals with a derrick having hydraulically operated means for moving the derrick parts from a collapsed position on the top of the truck body to an upright and operative position, whereby the derrick can be quickly and easily set up for use and as quickly and easily collapsed for transportation from place to place.

The novel features of the invention will be best understood from the following description, when taken together with the accompanying drawing, in which certain embodiments of the invention are disclosed and in which the separate parts are designated by suitable reference characters in each of the views and, in which:

Fig. 1 is a diagrammatic view of the rear of the upper portion of a truck showing one form of derrick mounted thereon in raised position in full lines and in collapsed position upon the truck in dotted lines.

Fig. 2 is a rear view of the upper portion of a truck showing the derrick generally in the position shown in Fig. 1 and omitting parts of the construction; and Fig. 3 is a side view of the forward end portion of a truck showing a slightly modified form of derrick construction mounted in connection therewith, the derrick being shown in upright position in full lines and in collapsed and outwardly extended positions in dot and dash lines.

In Fig. 1 of the drawing, I have indicated at 10 the upper rear portion of a truck equipped with a power driven winch, indicated in dotted lines at 11 and, at 12, I have shown one form of my improved derrick construction.

The derrick is generally of the tripod-type and comprises what may be termed an A-frame 13 pivoted to the upper side corners of the body 10 on a cross and reinforced brace rod 14, as clearly noted in Fig. 2 of the drawing. The upper end of the frame 13 is contracted and supports a pulley or shive 15, over which the cable 16 from the winch 11 passes. The cable 16 also passes around another pulley or shive 17 arranged at the lower casing portion 18 of a main hydraulic cylinder 19, which constitutes part of the main leg 20 of the derrick. This arrangement of the cable takes place when the frame 13 is in collapsed position.

The leg 20 comprises telescoping parts actuated through the medium of the hydraulic cylinder in adjusting position of the derrick from an upright to an outwardly extending operative position. The lower part 21 of the main leg carries an apertured ring or eye, which is adapted to be positioned within a yoke 22 and secured to the yoke by a pin 23, as noted in Fig. 2 of the drawing. The yoke is secured to the rear central portion of the bottom of the truck body.

At this time, it may be well to point out that the derrick structure leaves substantially all of the compartment of the truck accessible for use even when the main leg is in operative position, as shown, this leg plus the cable 16 forming the only obstruction.

The casing part 18 includes a hook 24, with which the free end 16' of the cable can be coupled when the cable is not in use and in the operation of collapsing the derrick onto the top of the truck body, as indicated in dotted lines in Fig. 1 of the drawing. It will be noted that the forward portion of the truck body includes a roller or other support 25, upon which the derrick is free to rest. The pivotal support comprises the rod 14 and is preferably braced on the truck body by side braces, one of which is diagrammatically shown at 26 in Fig. 1 of the drawing, these braces being coupled with a suitable channel iron support 27 on the truck body.

The main leg 20, or the upper portion thereof, carries a yoke 28 adapted to receive a prop or what is sometimes termed a stiff leg 29, a pin 30 being passed through the yoke to retain the prop in collapsed position. However, upon removal of the pin, the prop can be extended for engagement with the ground, for example, in the manner illustrated in the form of construction shown in Fig. 3 of the drawing. The prop 29 comprises telescoping parts for adjusting the length thereof and a pin 31 is employed to control this adjustment, the pin engaging spaced holes on one of the parts.

The lower part of the prop is also apertured, as seen at 32, for mounting of a foot or base plate thereon as and when desired. The latter is particularly desirable in certain soil conditions.

It might be well to point out at this time that derricks of the kind under consideration are utilized to a large degree in the pulling and setting of telephone and other poles and, from this standpoint, it will be understood that various types and kinds of soil conditions are experienced in different weather conditions and in different parts of the country.

Pivoted to the top and one side of the body 10, as seen at 33, is another hydraulic cylinder 34 having a plunger end 35 which is pivoted to a projecting arm 36 on one side of the frame 13. The cylinder 34 is utilized in moving the derrick from the collapsed position shown in dotted lines in Fig. 1 to an upright position, as shown in said figure, after which the cylinder 19 is operated to bring the lower portion 21 of the main leg 20 in position for coupling with the yoke 22, whereupon the derrick is in position for operation which can be controlled by actuation of the hydraulic cylinders to move the frame 13 into the desired angular or reaching position with respect to the truck body and, as and when required, the prop or stiff leg can be released and moved into the perpendicular position to give added bearing support upon the ground, particularly in the operation of pulling poles. Suitable control valves will be provided for controlling the hydraulic mechanism which will be actuated through the power plant of the truck but, as the valve control forms no direct part of the present invention, no specific showing, nor description thereof, is given. The controls and operation will be apparent to anyone skilled in the art.

It will be noted that the main leg of the derrick is pivoted to the upper contracted end of the frame 13, as seen at 37. At 37' I have shown the pivotal mounting of the prop with the upper part of the frame 13.

In Fig. 3 of the drawing, I have diagrammatically shown at 38 the forward end portion of a truck and at 39 I have indicated the winch in the truck body. At 40 is shown a forward and preferably reinforced extension on the frame of the truck at the normal bumper area thereof.

At 41 is shown a derrick generally similar to the derrick 12 shown in Figs. 1 and 2. 42 represents a frame, similar to the frame 13; 43 the main leg, in which is disposed the hydraulic cylinder 44 and 45 shows the prop or stiff leg, similar to the prop 29. The cylinder 44 operates in the same manner as the cylinder 19.

The frame 42 is pivoted to a forwardly extending reinforced support 46 on the top of the truck and preferably extending over the cab of the truck, the frame being pivoted to the support, as seen at 47, the latter pivots being preferably individual pivots on each side of the support 46 instead of the rod pivot, as shown at 14 in Fig. 2 of the drawing. The side members of the frame 42 will have arm extensions, as at 48, with which is coupled a crossrod 49, to which the plunger end 50 of a hydraulic cylinder 51 is pivotally coupled, the cylinder 51 being located centrally between the pivoted sides 47 of the frame 42.

With the construction shown in Fig. 3, the upper portion of the body 38 has a pulley or shive 52, over which the cable 53 from the winch passes, the cable passing over a pulley or shive 54 at the upper contracted end of the frame 42, as with the construction shown in Figs. 1 and 2. The top of the truck body 38 has a shoe 55, over which the cable 53 passes when the derrick 41 is moved into the lowered position upon the top of the truck. The top of the truck will have a support 56, upon which the derrick 41 can rest in its collapsed position.

The frame support 40 will have a yoke 57, similar to the yoke 22, for coupling of the lower end 58 of the leg 43 through the medium of a pivot pin, as at 59. A suitable strap or yoke 60, similar to the yoke 28, is employed to hold the prop or stiff leg 45 in collapsed position upon the arm 43. The prop 45 is generally similar to the prop 29. Therefore, no further detailed description will be given thereof.

In Fig. 3 of the drawing, I have shown an extended position of the derrick with the frame 41 reaching outwardly from the truck and with the prop 45 arranged in perpendicular position to brace and support the outer end of the frame 41. With the construction shown in Fig. 3, the derrick is moved to its upright position, primarily through the action of the hydraulic cylinder 51, after which, the cylinder 44 is actuated to bring the end 58 of the arm in position for coupling with the yoke 57. The derrick can be operated through the mediums of the hydraulic cylinders to any desired position, after which, the winch can be actuated to lift or lower poles or the like with respect to the ground or a hole in the ground. Here again, it will be apparent that, whenever desired, the derrick can be quickly moved into its collapsed position upon the truck in moving the truck to a different position and again quickly set up for use without detaching or uncoupling any of the derrick parts. The only coupling and uncoupling which is required is with the yokes 22 and 57 controlling the lower pivotal mounting of the main leg of the derrick and also the releasing and collapsing of the prop or stiff leg as and when the latter is utilized.

From the foregoing it will be apparent that hydraulically actuated derricks of the type and kind under consideration can be applied to both forward and rear mountings on a truck and, while mention has herein been specifically made to the handling of poles, derricks of the kind under consideration can be utilized for any purpose and in operating mechanisms or apparatus of any type and kind.

The two derricks disclosed comprise three primary parts, namely the frame, the main leg and the prop with hydraulic cylinders controlling operation of these parts and movement thereof from collapsed to extended positions.

As previously stated, the various hydraulic controls as well as the tubing of the hydraulic system are not shown, but it will be apparent to those skilled in the art that the tubing of the hydraulic system, particularly in extending to the hydraulic cylinder of the main leg, will extend along the frame to the upper pivot portion of the main leg and, then, down along the main leg to the cylinder and, in such a manner, as to permit freedom of movement not only of the frame but of said main leg in swinging the derrick from the collapsed position to the upright and also extended positions in the use of the derrick. It might also be said at this time that, insofar as the controls are concerned, these controls will preferably be located at the rear portion of the truck with the structure shown in Fig. 1 and at the forward portion of the truck with the structure shown in Fig. 3.

Having fully described my invention, what I claim as new and desire to secure by Letters Patent is:

1. A hydraulically actuated derrick for trucks, said derrick comprising an A-shaped frame, a truck body, means for pivotally mounting the lowed wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, and means comprising a hydraulic cylinder coupled with the truck body and said frame adjacent said pivot means for movement of the frame and said main leg from a collapsed position on the truck body to an upright operable position and from the operable position to said collapsed position.

2. A hydraulically actuated derrick for trucks, said derrick comprising an A-shaped frame, a truck body, means for pivotally mounting the lower wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, means comprising a hydraulic cylinder coupled with the truck body and said frame adjacent said pivot means for movement of the frame and said main leg from a collapsed position on the truck body to an upright operable position and from the operable position to said collapsed position, a prop pivotally mounted in connection with the upper end of said frame, and means for normally supporting the prop in substantially parallel collapsed position on said main leg.

3. A hydraulically actuated derrick for trucks, said derrick comprising an A-shaped frame, a truck body, means for pivotally mounting the lower wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, means comprising a hydraulic cylinder coupled with the truck body and said frame adjacent said pivot means for movement of the frame and said main leg from a collapsed position on the truck body to an upright operable position and from the operable position to said collapsed position, and the coupling of the second named hydraulic cylinder with the frame comprising an arm projecting from the frame adjacent the pivot end of said frame.

4. A hydraulically actuated derrick for trucks, said derrick comprising an A-shaped frame, a truck body, means for pivotally mounting the lower wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, means comprising a hydraulic cylinder coupled with the truck body and said frame adjacent said pivot means for movement on the truck body to an upright operable position and from the operable position to said collapsed position, the coupling of the second named hydraulic cylinder with the frame comprising an arm projecting from the frame adjacent the pivot end of said frame, the forward upper end portion of the truck body having an extending support with which said first named pivot means is coupled, and the pivotal support of said main leg with the frame comprising a yoke secured to the forward lower central portion of the truck body.

5. A hydraulically actuated derrick for trucks, said derrick comprising an A-shaped frame, a truck body, means for pivotally mounting the lower wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, means comprising a hydraulic cylinder coupled with the truck body and said frame adjacent said pivot means for movement on the truck body to an upright operable position and from the operable position to said collapsed position, the coupling of the second named hydraulic cylinder with the frame comprising an arm projecting from the frame adjacent the pivot end of said frame, the forward upper end portion of the truck body having an extending support with which said first named pivot means is coupled, the pivotal support of said main leg with the frame comprising a yoke secured to the forward lower central portion of the truck body, and a pulley on the upper portion of the truck body rearwardly of the driver's compartment over which the cable from said winch is adapted to pass.

6. A hydraulically actuated derrick for trucks, said derrick comprising an A-shaped frame, a truck body, means for pivotally mounting the lower wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, means comprising a hydraulic cylinder coupled with the truck body and said frame adjacent said pivot means for movement of the frame and said main leg from a collapsed position on the truck body to an upright operable position and from the operable position to said collapsed position, a prop pivotally mounted in connection with the upper end of said frame, means for normally supporting the prop in substantially parallel collapsed position on said main leg, and means on the truck body for supporting the contracted upper end portion of the frame when in collapsed position on the truck body.

7. A hydraulically actuated derrick for trucks, said derrick comprising a frame having upper contracted and lower wide ends, a truck body, means for pivotally mounting the lower wide ends of the frame in fixed position on an upper portion of the truck body, the other contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, and means comprising a hydraulic cylinder mounted on the truck body in spaced relation to said pivot means and coupled with the frame adjacent said pivot means for movement of the frame and said main leg from a collapsed position on the truck body to an upright operable position and from the operable position to said collapsed position.

8. A hydraulically actuated derrick for trucks, said derrick comprising an A-shaped frame, a truck body, means for pivotally mounting the lower wide ends of the frame in fixed position on an upper portion of the truck body, the upper contracted end of the frame supporting a pulley over which a cable from a winch on the truck body is adapted to pass, a main leg pivoted to the upper portion of said frame, said leg including a hydraulic cylinder, means in wide spaced relation below said frame pivot means for detachably coupling the lower portion of the leg with the truck body in support of said derrick in upright position with respect to the truck, means comprising a hydraulic cylinder coupled with the truck body and said frame adjacent said pivot means for movement of the frame and said main leg from a collapsed position on the truck body to an upright operable position and from the operable position to said collapsed position, and means engaging the cable in movement of the derrick into collapsed position on the truck body.

References Cited in the file of this patent
UNITED STATES PATENTS

| | | |
|---|---|---|
| 1,096,337 | Wieland | May 12, 1914 |
| 1,699,480 | Snow | Jan. 15, 1929 |
| 1,764,935 | Davey et al. | June 17, 1930 |
| 2,406,620 | Luckett | Aug. 27, 1946 |
| 2,541,970 | Pospisil | Feb. 13, 1951 |
| 2,598,517 | Drott | May 27, 1952 |
| 2,611,580 | Troche et al. | Sept. 23, 1952 |
| 2,616,666 | Honey | Nov. 4, 1952 |